United States Patent
Roy et al.

(10) Patent No.: US 11,211,999 B2
(45) Date of Patent: Dec. 28, 2021

(54) SATELLITE NETWORK VIRTUAL LAN USAGE

(71) Applicant: Hughes Network Systems, LLC, Germantown, MD (US)

(72) Inventors: Satyajit Roy, Gaithersburg, MD (US); George Choquette, Potomac, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 267 days.

(21) Appl. No.: 15/856,736

(22) Filed: Dec. 28, 2017

(65) Prior Publication Data
US 2019/0207674 A1    Jul. 4, 2019

(51) Int. Cl.
*H04B 7/185*    (2006.01)
*H04L 12/46*    (2006.01)

(52) U.S. Cl.
CPC ..... *H04B 7/18584* (2013.01); *H04L 12/4633* (2013.01); *H04L 12/4645* (2013.01)

(58) Field of Classification Search
None
See application file for complete search history.

(56) References Cited

U.S. PATENT DOCUMENTS

| | | | | |
|---|---|---|---|---|
| 5,920,566 A * | 7/1999 | Hendel | ................... | H04L 12/18 370/401 |
| 6,112,251 A * | 8/2000 | Rijhsinghani | ....... | H04L 12/4645 370/389 |
| 6,757,298 B1 * | 6/2004 | Burns | ................. | H04L 12/4608 370/395.53 |
| 6,901,072 B1 * | 5/2005 | Wong | ................... | H04L 12/4645 370/360 |
| 7,796,614 B1 * | 9/2010 | Weymans | ............... | H04L 45/02 370/396 |
| 2004/0083295 A1 * | 4/2004 | Amara | ................ | H04L 12/4633 709/229 |
| 2005/0047329 A1 * | 3/2005 | Almog | ................ | H04L 12/4679 370/225 |
| 2005/0152366 A1 * | 7/2005 | Heuck | ................. | H04L 12/2801 370/390 |
| 2005/0175022 A1 * | 8/2005 | Nishimura | ............ | H04L 45/502 370/401 |
| 2005/0198258 A1 * | 9/2005 | Narsinh | ................ | H04L 49/354 709/224 |
| 2005/0237955 A1 * | 10/2005 | Shapira | ................. | H04W 12/03 370/299 |
| 2006/0133811 A1 * | 6/2006 | Gumaste | ............. | H04J 14/0227 398/83 |
| 2006/0248229 A1 * | 11/2006 | Saunderson | ........ | H04L 61/2015 709/245 |
| 2006/0256720 A1 * | 11/2006 | Curran-Gray | ......... | H04L 41/145 370/235 |

(Continued)

*Primary Examiner* — Christopher T Wyllie
(74) *Attorney, Agent, or Firm* — Bejin Bieneman PLC

(57) ABSTRACT

A satellite telecommunication system includes a satellite and multiple computing devices. One computing device is in communication with the satellite and programmed to generate a virtual local area network (VLAN) packet with a VLAN tag and transmit the VLAN packet to the satellite. Another computing device is in communication with the satellite and programmed to receive the VLAN packet, determine VLAN tag information from the VLAN tag, and forward at least the original packet while preserving VLAN tag information associated with the VLAN tag.

20 Claims, 6 Drawing Sheets

(56) References Cited

U.S. PATENT DOCUMENTS

| | | | |
|---|---|---|---|
| 2007/0183415 A1* | 8/2007 | Fischer | H04L 49/3009 370/389 |
| 2007/0226765 A1* | 9/2007 | Bahnck | H04H 20/103 725/63 |
| 2008/0201748 A1* | 8/2008 | Hasek | H04N 21/454 725/98 |
| 2008/0301727 A1* | 12/2008 | Cristofalo | G06Q 30/02 725/35 |
| 2009/0052323 A1* | 2/2009 | Breynaert | H04N 21/23655 370/235 |
| 2009/0109983 A1* | 4/2009 | Dixon | H04L 12/1471 370/401 |
| 2010/0014526 A1* | 1/2010 | Chavan | H04L 12/467 370/395.53 |
| 2010/0020681 A1* | 1/2010 | Nakashima | H04L 47/14 370/229 |
| 2010/0280858 A1* | 11/2010 | Bugenhagen | H04L 43/00 705/50 |
| 2010/0290474 A1* | 11/2010 | Kaippallimalil | H04L 12/4666 370/395.53 |
| 2011/0023125 A1* | 1/2011 | Kim | H04L 67/18 726/26 |
| 2012/0124161 A1* | 5/2012 | Tidwell | H04L 63/0421 709/217 |
| 2012/0151057 A1* | 6/2012 | Paredes | H04L 12/4641 709/225 |
| 2012/0254996 A1* | 10/2012 | Wilbourn | H04L 61/6009 726/22 |
| 2013/0046849 A1* | 2/2013 | Wolf | H04N 21/4384 709/217 |
| 2013/0201979 A1* | 8/2013 | Iyer | H04W 84/12 370/338 |
| 2014/0018037 A1* | 1/2014 | Shanmugavadivel | H04W 48/18 455/411 |
| 2014/0351396 A1* | 11/2014 | Stabile | H04L 41/12 709/223 |
| 2014/0359148 A1* | 12/2014 | Cherian | H04W 12/06 709/229 |
| 2016/0127122 A1* | 5/2016 | Yu | H03L 7/093 375/375 |
| 2017/0048143 A1* | 2/2017 | Roy | H04L 12/28 |

* cited by examiner

SATELLITE NETWORK VIRTUAL LAN USAGE

BACKGROUND

A virtual local area network (VLAN) allows traffic over a single local area network (LAN) to be treated as traffic over multiple LANs. With a VLAN, traffic from computers on the same LAN can be segregated as if the computers were on different LANs. Thus, a computer network can get the benefits of multiple LANs without the overhead in implementing different LANs.

DETAILED DESCRIPTION

Figure 1:
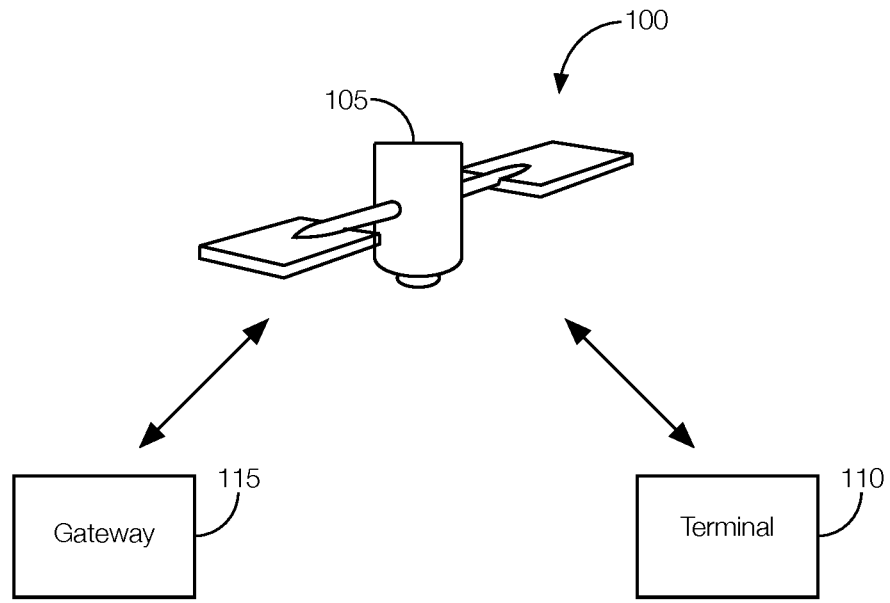
FIG. 1 illustrates an example telecommunications network using VLAN tags to create virtual LANs (VLANs).

A VLAN can be used to restrict communication between computers on the same LAN. For example, in a network with computers A, B, C, and D, and where computers A and B are in one department and computers C and D are in another department, a VLAN can be used to isolate computers A and B from computers C and D. That is, the VLAN allows computers A and B to communicate with one another as though they were on one LAN while allowing computers C and D to communicate with one another as though they were on a different LAN. Thus, although all four computers are physically on the same LAN, their communications are restricted as though they were on different LANS.

Further, a single switch can service traffic for all four computers by tagging the traffic with various VLAN tags. A VLAN tag of VLAN 10 may be applied to packets transmitted by computers A and B and a VLAN tag of VLAN 20 may be applied to packets transmitted by computers C and D. The switch or recipient node can restrict communications according to the VLAN tag applied to the packet. For example, the switch may not allow computer A to access information stored on computer C since they are part of different VLANs. The switch may determine that computers A and C are part of different VLANs based on the VLAN tags transmitted by computer A, computer C, or both.

VLANs can also be implemented in a satellite setting. That is, VLAN tags can be used to create VLANs within satellite networks. A satellite telecommunication system (or satellite network) using VLANs may include a satellite, a first computing device in communication with the satellite and programmed to generate a virtual local area network (VLAN) packet with a VLAN tag and transmit the VLAN packet to the satellite. The system may further include a second computing device in communication with the satellite and programmed to receive the VLAN packet, determine VLAN tag information from the VLAN tag, and forward at least the original packet while preserving VLAN tag information associated with the VLAN tag.

In the satellite telecommunication system, the second computing device may be programmed to preserve the VLAN tag information by removing a VLAN header from the VLAN packet and saving the VLAN tag information included in the VLAN header.

In the satellite telecommunication system, the second computing device may be programmed to prioritize network traffic according to the VLAN tag.

In the satellite telecommunication system, the VLAN tag may be an original VLAN tag, and the second computing device may be programmed to remap the original VLAN tag to a new VLAN tag. Remapping the original VLAN tag to a new VLAN tag may include determining the new VLAN tag for the original packet based at least in part on the original VLAN tag and encapsulating the original packet with the new VLAN tag.

In the satellite telecommunication system, the second computing device may be programmed to implement a VLAN-based rate control. Implementing a VLAN-based rate control may include determine a processing rate associated with the VLAN tag and processing the VLAN packet according to the processing rate associated with the VLAN tag.

In the satellite telecommunication system, the second computing device may be programmed to share a cache between multiple VLANs. In that implementation, the VLAN tag may include a first VLAN tag, and sharing the cache between multiple VLANs may include receiving a DNS query associated with a first VLAN tag, storing a result of the DNS query associated with the first VLAN tag in the cache, and making the result available from the cache in response to a DNS query associated with a second VLAN tag. Alternatively, sharing the cache between multiple VLANs may include receiving a request for web content associated with a first VLAN tag, storing a result of the request for web content associated with the first VLAN tag in the cache, and making the result available from the cache in response to a request for web content associated with a second VLAN tag.

In the satellite telecommunication system, the second computing device may be programmed to provide virtual network operator VLAN provisioning. Providing virtual network operator VLAN provisioning may include identifying a service provider associated with the VLAN tag and transmitting the VLAN packet to the service provider associated with the VLAN tag.

A method includes receiving, at a satellite network computing device, a virtual local area network (VLAN) packet with a VLAN tag and an original packet. The method further includes determining VLAN tag information from the VLAN tag and forwarding at least the original packet while preserving VLAN tag information associated with the VLAN tag.

The method may further include preserving the VLAN tag information by removing a VLAN header from the VLAN packet, processing the VLAN packet after removing the VLAN header, and appending the VLAN header to the VLAN packet before transmitting the VLAN packet out of the satellite network.

The method may further include prioritizing network traffic according to the VLAN tag.

In the method, the VLAN tag may be an original VLAN tag. In that implementation, the method may further include remapping the original VLAN tag to a new VLAN tag. Remapping the original VLAN tag to a new VLAN tag may include determining the new VLAN tag for the original packet based at least in part on the original VLAN tag encapsulating the original packet with the new VLAN tag.

The method may further include implementing a VLAN-based rate control by determining a processing rate associated with the VLAN tag and processing the VLAN packet according to the processing rate associated with the VLAN tag.

In the method, the VLAN tag may include a first VLAN tag. In that implementation, the method may further include sharing a cache between multiple VLANs by receiving a DNS query associated with the first VLAN tag, storing a result of the DNS query associated with the first VLAN tag in the cache, and making the result available from the cache in response to a DNS query associated with a second VLAN tag.

In the method, the VLAN tag may include a first VLAN tag. In that implementation, the method may further include sharing a cache between multiple VLANs by receiving a request for web content associated with a first VLAN tag, storing a result of the request for web content associated with the first VLAN tag in the cache, and making the result available from the cache in response to a request for web content associated with a second VLAN tag.

The method may further include providing virtual network operator VLAN provisioning by identifying a service provider associated with the VLAN tag and transmitting the VLAN packet to the service provider associated with the VLAN tag.

The elements shown may take many different forms and include multiple and/or alternate components and facilities. The example components illustrated are not intended to be limiting. Indeed, additional or alternative components and/or implementations may be used. Further, the elements shown are not necessarily drawn to scale unless explicitly stated as such.

As illustrated in FIG. 1, a telecommunication system 100 (sometimes referred to as a "satellite network 100" below) includes any number of computing devices, such as satellites 105, terminals 110, and gateways 115, each having a processor and memory. The memory is implemented via circuits, chips or other electronic components and can include one or more of read only memory (ROM), random access memory (RAM), flash memory, electrically programmable memory (EPROM), electrically programmable and erasable memory (EEPROM), embedded MultiMediaCard (eMMC), a hard drive, or any volatile or non-volatile media etc. The memory may store instructions executable by the processor and other data. The processor is implemented via circuits, chips, or other electronic component and may include one or more microcontrollers, one or more field programmable gate arrays (FPGAs), one or more application specific integrated circuits (ASICs), one or more digital signal processors (DSPs), one or more customer specific integrated circuits, etc. The processors may be programmed to execute instructions stored in the memory to carry out the actions of the satellites 105, terminals 110, and gateways 115 discussed below.

The satellites 105 collectively form a constellation (i.e., a group) of network nodes whose position changes relative to one another, to the ground, or both. The satellites 105 include various circuits, chips, or other electronic components. Satellites 105 may be in low Earth orbit (LEO) in multiple planes and orbits relative to one another. Examples of orbits may include a polar orbit, a geosynchronous orbit, or an inclined orbit. Because the satellites 105 are moving relative to the ground, the downlink and uplink beams served by each respective satellite 105 changes over time. Moreover, because the satellites 105 can move relative to one another, neighboring satellites 105 may also change over time. Thus, the other satellites 105 available for direct communication may change as one or more of the satellites 105 moves.

The terminals 110 are computer-based communication devices implemented via circuits, chips, antennas, or other electronic components that can communicate with satellites 105 that are within communication range of the terminal 110. In some instances, the terminals 110 are stationary relative to a location on Earth. In other instances, the terminals 110 are mobile, meaning that the terminals 110 move relative to a location on the Earth. In some instances, the terminal 110 may provide an interface between a satellite 105 and other ground-based communication devices. For instance, the terminal 110 may receive communications from a satellite 105 and transmit such communications via terrestrial-based communication channels. Likewise, the terminals 110 may receive communications via a terrestrial-based communication channel and transmit the communication to a satellite 105. The terminal 110 may include a modulator and a demodulator to facilitate communications with satellites 105, especially in the context of satellite 105 communication. Moreover, each terminal 110 may have one or more antennas. Multiple antennas may allow a terminal 110 to communicate with multiple satellites 105 at a time.

The gateways 115 are computer-based communication devices implemented via circuits, chips, antennas, or other electronic components that can communicate with one or more satellites 105 within the communication range of the gateway 115. Each gateway 115 may be programmed to use different uplink and downlink methods to transmit data to and receive data from satellites 105. The term gateways 115 may refer to data gateways and system gateways. Data gateways may be used to facilitate multiple communication protocols along a network path. For instance, a data gateway may be used to facilitate a transition from a satellite 105 communication network to, e.g., a fiber optic network. Each system gateway may be programmed to transmit control and configuration data to satellites 105 as well as receive data, such as telemetry data, from the satellites 105. The system gateways may be configured to form a routing network for receiving packets on the downlink before uplinking the packets to a different node, including a different satellite 105. Since system gateways can communicate with multiple satellites 105, the system gateway may be able to receive packets via the downlink from one satellite 105 and uplink the packets to a different satellite 105 without having to store and forward the packets. And because system gateways are programmed to transmit control and configuration data to satellites 105, the system gateway may be programmed to upload routing tables to any number of satellites 105 within the communication range of the system gateway. The system gateway may further include instructions for propagating the routing table to other satellites 105.

The VLAN may be implemented by any one or more of the satellite 105, terminal 110, or gateway 115. For example, the terminal 110, gateway 115, or both, may apply VLAN tags to packets transmitted from the terminal 110 or receive at the gateway 115. A packet with a VLAN tag may be referred to as a VLAN packet (see FIG. 2). The terminals 110 may be programmed to generate packets with VLAN tags. Such terminals 110 may transmit packets with the VLAN tags to the satellite 105, the gateway 115, or both. Other terminals 110 may transmit packets to the satellite 105 or gateway 115 without adding a VLAN tag, and the VLAN tag may be added to the packet by the satellite 105 or the gateway 115. The satellite 105 may be programmed to send packets, with or without the VLAN tag, to terminals 110, gateways 115, or other satellites 105. The gateway 115 may be programmed to receive packets, with or without the VLAN tag, from the terminals 110, the satellites 105, or both. In some instances, as discussed in greater detail below, the gateway 115 may be programmed to add the VLAN tag to packets received without a VLAN tag. The gateway 115 may be further programmed to transmit packets to one or more satellites 105, terminals 110, or both.

VLAN tags can be used in various ways to improve the operation of the telecommunication system 100. The telecommunication system 100 can use VLAN tags to preserve VLANs across satellite network end points (referred to as VLAN tag propagation over the satellite 105 space link, below), for classification and prioritization of network traffic, for VLAN remapping, for providing VLAN-based rate control, for providing shared domain name system (DNS) caching and web prefetching, and for providing jurisdictional (e.g., by country) virtual network operator (VNO) VLAN provisioning.

Figure 2:
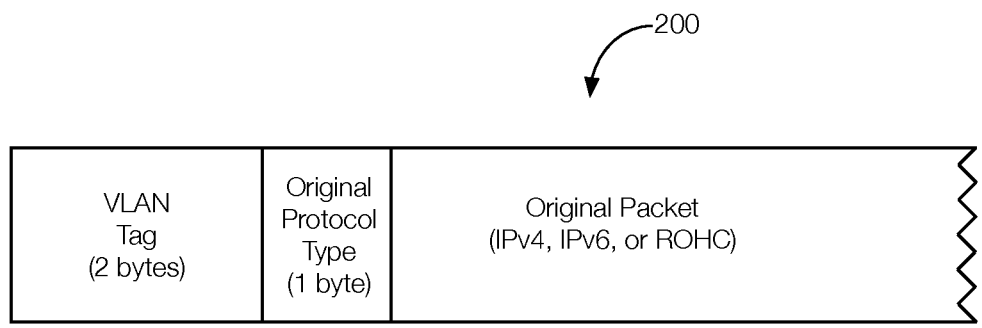
FIG. 2 illustrates an example satellite-based VLAN packet format.

Beginning with VLAN tag propagation over the satellite 105 space link, and with reference to FIGS. 1 and 2, some VLANs need to be preserved between the satellite network 100 end points. That is, packets entering the satellite network 100 on a specific VLAN may be required to exit the satellite network 100 on the same VLAN so that end-to-end VLAN identities are preserved. The satellite network 100 may use the IP over Satellite (IPoS) Time Division Multiple Access (TDMA) scheme in the inbound (also referred to as the inroute) link or return link and the Digital Video Broadcasting Satellite Second Generation Extension (DVB-S2X) standards on the outbound (also referred to as the outroute) link or forward link. VLAN is a layer 2 construct, and VLAN tags can be propagated between remote terminals 110 and the gateway 115 in a, e.g., hub-spoke satellite network using the satellite link layer protocol.

Different mechanisms or schemes may be employed to propagate VLANs for spoofed transmission control protocol (TCP) sessions and unspoofed TCP sessions and for connectionless sessions such as user datagram protocol (UDP), internet control message protocol (ICMP), or the like. In the former case, the VLAN tag may be propagated during the TCP connection setup and the VLAN tags may be saved into the context of the TCP connection. Subsequent packet transmission on the local LAN from the satellite network 100 end points may use VLAN tags from the context of the same TCP connection so long as the VLAN tag is not changed in the middle of the TCP session. In the latter case, the VLAN tag may be transmitted along with individual IP packets, and both the VLAN tag and priority value of the VLAN tag may be preserved across the satellite network 100.

On the inroute or return link, a protocol data unit (PDU) may be constructed to include the VLAN tag. The PDU with the VLAN tag may be referred to as a VLAN PDU or a VLAN packet 200. Constructing the VLAN PDU 200 may involve encapsulating the original PDU (an IP packet or a header compressed IP packet) with a 2 byte VLAN tag followed by information of the original protocol type. Examples of the original protocol type may include IPv4, IPv6, ROHC, etc. The VLAN PDU 200 may be carried within an IP encapsulation (IPE) packet by setting the protocol type field in the IPE header to VLAN PDU 200. IPE allows the VLAN PDU 200 or IP PDU to be carried within a TDMA burst. The gateway 115 may read the message of the received packet and take action based on the protocol type field. If the protocol type of the IPE PDU is layer 2 VLAN, the gateway 115 may remove the VLAN header from the PDU to get the original layer 3 user packet. The gateway 115 may further save the VLAN tag information. The gateway 115 may forward IPv4 or IPv6 packets on the LAN toward the external network by adding the layer 2 VLAN tag as stored while processing the VLAN PDU 200. On the outroute or forward link, generic stream encapsulation (GSE) may be used to propagate VLAN tags from the gateway 115 to the terminals 110.

Another use for VLAN tags involves classification and prioritization of network traffic, which can be used to send packets over the satellite link because the link is oversubscribed. Also, special handling of network traffic may improve service related to real time and/or delay and jitter sensitive traffic. A satellite network 100 can carry external network traffic from one site to another using VLANs to differentiate traffic of different characteristics. A satellite network 100 can use the layer 2 VLAN tags to provide the differentiated treatment of traffic.

For example, the scrambled code multiple access (SCMA) communication protocol takes advantage of very low-rate coding and incorporates various multiple access techniques. It allows different users of a communication system to efficiently share the same bandwidth by using specific scramblers to separate time slots. On the inroute to access an SCMA channel, terminals 110 do not require requesting stream bandwith and wait for a round trip time before data can be sent on the allocated stream bandwidth. Therefore, a VLAN carrying latency sensitive small volume traffic can be classified to access the SCMA channel on the return channel.

The satellite interface supports priorities on TDMA channels as well. Based on traffic characteristics and VLANs on which the traffic is entering the satellite network 100, the system may configure traffic from a specific VLAN to give a specific priority on the satellite interface. VLAN based classification and prioritization may also be supported on traffic sent from the gateway 115 to terminals 110 on the forward link.

Another possible implementation involves VLAN remapping. VLAN remapping allows VLANs on which packets enter the satellite network 100 to be modified by the satellite network 100 before the packets exit from the other side of the satellite network 100. VLAN remapping may apply to various use cases. Thus, using VLAN tags, the satellite network 100 may map one or more VLAN tags to one VLAN and one or more other VLAN tags to another VLAN.

A first use case may apply when a satellite network 100 is plugged into an existing customer network where VLANs used at the remote or branch office sites are different from those used at the central site. The satellite network 100 may translate from one VLAN to the other in the context of both spoofed and unspoofed traffic. This allows for seamless integration of the satellite network 100 with an existing VLAN based network that needs connectivity using the satellite transport.

A second use case occurs when a network lacks VLAN switches in an attempt to, e.g., reduce equipment costs even though the other end of the network needs VLANs to segregate traffic between multiple service providers. In this use case, the satellite network 100 may execute VLAN remapping to map untagged packets to tagged packets, and vice-versa.

A third use case occurs when multiple service providers use the same VLANs for the same type of traffic. In this case, the satellite network 100 can append an outer tag (which may be specific to the service provider), e.g., forming a double tag or Q-in-Q. The addition of the outer tag (e.g., a VLAN tag) allows for traffic segregation across multiple service providers. Additionally, the satellite network 100 can treat traffic from different service providers differently inside the satellite network 100 based on the outer tag.

A fourth use case involves a gateway 115 redundancy feature where the terminals 110 switch from a primary gateway 115 to a backup gateway 115 upon the failure of the primary gateway 115. The network topology may have different VLANs on the primary and backup gateways 115. Therefore, the satellite network 100 may use the VLAN tags to remap the VLAN packets 200 received from the remote terminals 110 to two different sets of VLANs at the gateway 115 depending on which gateway 115 is providing service.

A fifth use case may apply when the satellite network 100 supports a gateway 115 diversity feature where some designated terminals 110 can move between different gateways 115. This differs from the fourth use case because both gateways 115 remain online and operational. The terminal 110 may move to a different gateway 115 for any number of reasons including link failure, load rebalancing, etc. The configuration may use different VLANs for the different gateways 115. Therefore, the satellite network 100 may remap the VLANs received from the remote terminals 110 to two different sets of VLANs at the gateway 115 depending on the gateway 115 used by the terminal 110 to send traffic.

A sixth use case involves inter system roaming. In that case, two systems may use different VLANs at the network side, and the satellite network 100 may provide VLAN remapping to accommodate those different VLANs.

Another possible implementation involves VLAN-based rate control. Rate control generally refers to ensuring that sufficient bandwidth is available for certain types of network traffic. VLAN-based rate control may be incorporated into a satellite network 100 to use satellite bandwidth more efficiently. Multiple mobile network operators (MNOs) can provide cellular backhaul service sharing a remote terminal 110 at a base station. VLAN tags can be used to differentiate service from multiple MNOs.

For example, different telecommunications services, such as 2G, 3G, and 4G/LTE, may be provided through the same remote terminal 110 and the same gateway 115. Each service can use a different VLAN tag for its respective traffic. Thus, rates for some traffic, such as traffic for 2G and 3G service, which is smaller in volume and throughput than traffic for 4G/LTE service, can be configured as separate VLANs, and the satellite network 100 can ensure that the configured rates are met when there is sufficient demand for such traffic. In other words, by separating the different types of traffic onto different VLANs, some traffic, such as 4G/LTE traffic, will not starve other traffic, such as 2G and 3G traffic. When there is not sufficient demand for the 2G and 3G traffic, all remaining bandwidth can go toward servicing the 4G/LTE traffic in a best effort model to reach the peak information rate (PIR) or maximum information rate.

Another example VLAN-based rate control may be in the form of a guest WiFi deployment. That is, VLAN tags may be used to prevent guest traffic from saturating satellite bandwidth via rogue devices since meeting enterprise and business traffic needs may be the subject of various service level agreements. In this case, the components of the satellite network 100 may use VLAN tags to impose a rate limit on a guest WiFi VLAN.

Controlling VLAN rates at the point of ingress of a satellite network 100 can create some challenges. One challenge presents itself in the context of subscription models. For example, assuming three VLANs, and the terminal 110 level upload subscription is divided among the three VLANs. Due to various optimization functions such as header compression, payload compression, ACK reduction, and multiplexing, which strive to utilize the satellite resource as efficiently as possible, if at the ingress the offered load is rate controlled at a value that is equal to the satellite bits subscription, the satellite bits usage from the terminal 110 will never reach the subscription plan. As the gain due to various optimization functions is dynamic in nature and may change frequently, it might not be possible to configure VLAN rate control values statically that match the satellite bandwidth usage. A predictive learning process may be used to monitor satellite optimization gain over time and predict the gain at a specific time of a day or week and dynamically change the VLAN rates. This allows for dynamic setting of the rate control value for each VLAN. This is also applicable to VLAN based rate control on the outroute or forward link from the gateway 115 to the terminals 110.

Another challenge is how to ensure that bandwidth is not wasted. By way of example, assume a customer has subscribed to a 6 Mbps uplink service plan that provides service through three different VLANs (referred to as VLANS A, B and C). Each VLAN may be configured with a 2 Mbps committed service rate. Depending on the traffic pattern, the load on VLAN A may be 4 Mbps, the load on VLAN B may be 5 Mbps, and there may be no traffic on VLAN C. If the rate control were performed in 1:1:1 ratio without consideration for allocating excess available capacity, VLAN A will get 2 Mbps and VLAN B 2 Mbps, meaning that 2 Mbps will be wasted, and also that 2 Mbps of sourced traffic will be dropped for VLAN A and 3 Mbps of traffic will be dropped for VLAN B. Instead, the unused rate of VLAN C can be assigned to VLAN A and VLAN B, both of which have exceeded the committed rate, but both of which are, in this example, allowed a peak rate above the committed 2 Mbps rate, for example a peak rate of 6 Mbps. This allocation can be made according to the baseline 1:1 committed rate ratio, with each VLAN getting 3 Mbps of capacity allocation, or can be made using some other ratio. One option is to calculate dynamic weights between VLANs based on demand and exceeded rate. In this example, the exceeded rate on VLAN A is 1 Mbps and on VLAN B is 2 Mbps. The 2 Mbps unused bandwidth can be distributed between VLANs A and B taking into consideration of the demand and configured rate limit. A dynamic weight of, e.g., $(3 \times 4):(3 \times 5)=4:5$ is calculated between VLANs A and B, and 2 Mbps unused bandwidth may be divided between VLANs A and B (e.g., VLAN A gets an additional $2 \times 4/9 = 0.89$ Mbps and VLAN B gets an additional $2 \times 5/9 = 1.11$ Mbps.

Turning now to the shared DNS caching and web prefetching implementation, a satellite modem may provide a local DNS caching function to mitigate high satellite delay round trip times for DNS queries. A web accelerator (or a web acceleration feature) may provide transient caching of web content that is likely to be requested by the end user. This is done by prefetching the embedded objects of an URL. The prefetching is done by a server at the gateway 115, and at least some of the content is downloaded to the terminal 11. Taking advantage of caching information obtained for one VLAN, and using that information for a DNS query or web request from other VLANs, the shared caching concept can be implemented inside the terminal 110. For example, 3G traffic associated with one VLAN tag (e.g., VLAN 10) may result in a DNS query of a web page, and the terminal 110 may save the response in the cache. If 4G traffic using another VLAN tag (e.g., VLAN 20) requests that same web page, the DNS response can be served from the cache even though the caching was performed under a different VLAN tag (e.g., VLAN 10). A similar concept can be applied to web caching and web prefetching.

Another possible implementation involves providing jurisdictional (e.g., by country) virtual network operator (VNO) VLAN provisioning. This may occur when a satellite beam overlaps two countries. Traffic originating from each country may be routed through a specific Internet service provider (ISP) network associated with that country. A terminal 110 can be assigned a specific VLAN based on the location of the terminal 110 (e.g., where the terminal 110 was installed). For example, if the VLAN tag of VLAN 10 is assigned to country A and the VLAN tag of VLAN 20 is assigned to country B, terminals 110 located in country A are configured with VLAN 10 and terminals 110 located in country B are configured with VLAN 20. The terminal 110 propagates VLAN packets 200 to the gateway 115. The gateway 115 uses the VLAN tags incorporated into the VLAN packets 200 received from the terminals 110 to route packets to either the ISP for country A or the ISP for Country B.

Another use case for segregating VNO traffic using VLAN tags is if the satellite network 100 is operating under a wholesaler-reseller model of service provisioning. This model is sometimes called the HNO-VNO model. The satellite network 100 may assign a unique VLAN to each VNO, and the satellite network 100 may tag traffic from a specific VNO to the corresponding VLAN.

Figure 3:
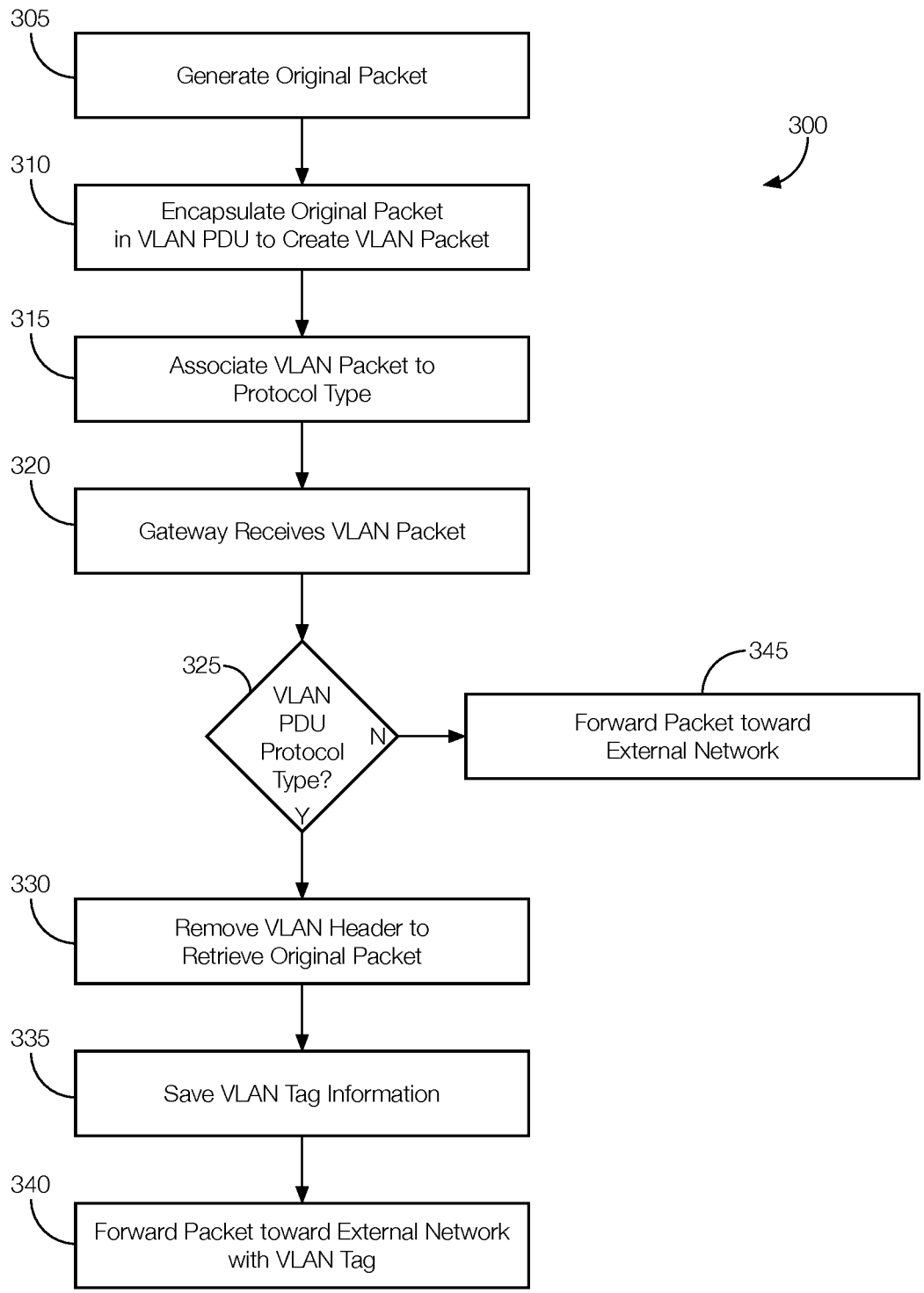
FIG. 3 is a flowchart of an example process that may be executed by the satellite network to propagate a VLAN tag.

FIG. 3 is a flowchart of an example process 300 that may be executed by the satellite network 100 to propagate a VLAN tag over the satellite space link. Unless otherwise stated, portions of the process 300 may be performed at the terminal 110, the gateway 115, or a combination thereof. At block 305, an original packet is generated. The original packet may be generated as an IP packet or header compressed IP packet in accordance with, e.g., an IPv4, IPv6, or ROHC. The original packet may be the PDU packet discussed above. At block 310, the original packet is encapsulated to create a VLAN packet 200. As shown in FIG. 2, encapsulating the original packet may include adding a VLAN tag (e.g., 2 bytes) to the beginning of the original packet and adding protocol information between the VLAN tag and the original packet. At block 315, a protocol type is associated with the VLAN packet 200. That is, the protocol type field in the header may be set to VLAN PDU 200 as previously explained. At block 320, the gateway 115 receives the VLAN packet 200. At decision block 325, the gateway 115 determines the protocol type. If the protocol type is VLAN PDU 200, the process 300 proceeds to blocks 330-340. At block 330, the gateway 115 removes the VLAN header to retrieve the original packet. At block 335, the gateway 115 saves the VLAN tag information. At block 340, the gateway 115 forwards the packet on the LAN toward the external network by adding the layer 2 VLAN tag. If the protocol type is not VLAN PDU 200, the gateway 115 may forward the packet toward the external network at block 345.

Figure 4:
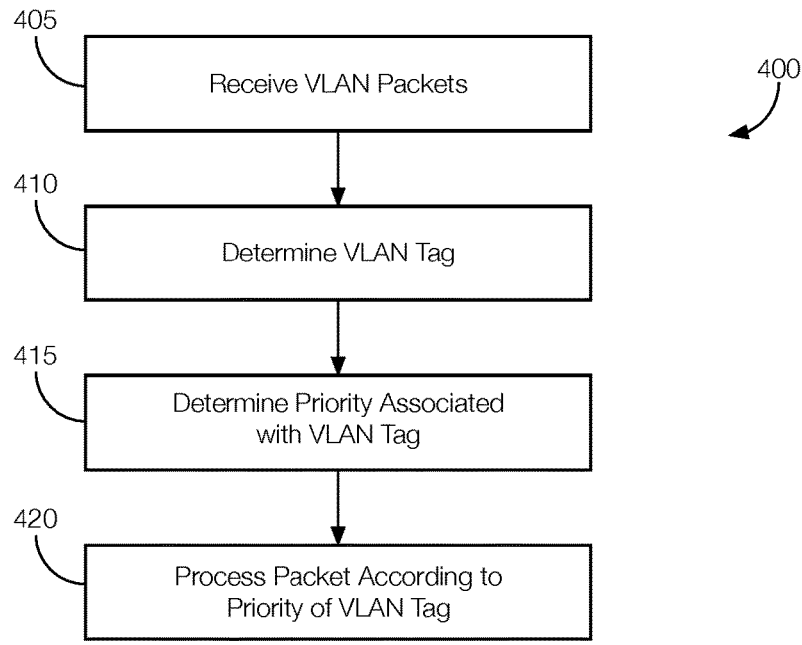
FIG. 4 is a flowchart of an example process that may be executed by the satellite network to classify and prioritize network traffic using VLAN tags.

FIG. 4 is a flowchart of an example process 400 that may be executed by the satellite network 100 to classify network traffic according to VLAN tags. Portions of the process 400 may be performed at the terminal 110, the gateway 115, or a combination thereof. At block 405, VLAN packets 200 are received. The VLAN packets 200 include VLAN tags. At block 410, the VLAN tag of the VLAN packet 200 is determined. For instance, one VLAN may be associated with a VLAN tag of "VLAN 10" and another VLAN may be associated with a VLAN tag of "VLAN 20." At block 415, the satellite network 100 determines a priority associated with the VLAN tag. At block 420, the satellite network 100 processes the VLAN packet 200 according to the priority associated with the VLAN tag.

Figure 5:
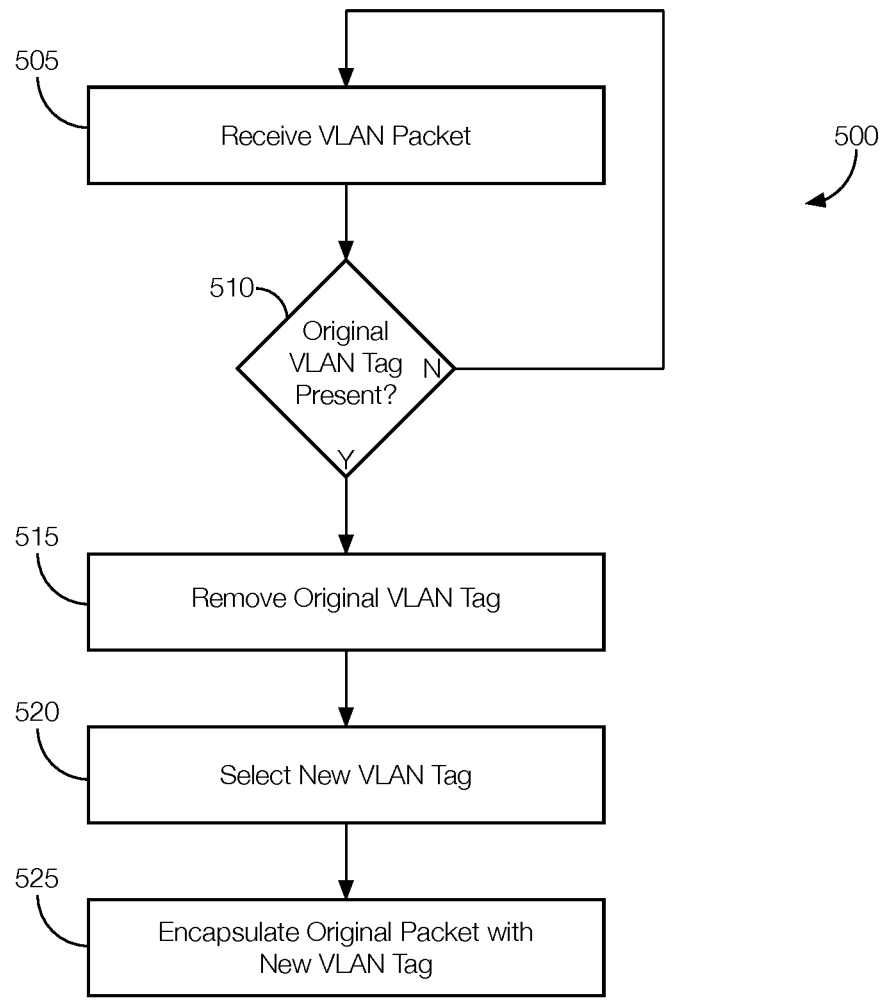
FIG. 5 is a flowchart of an example process that may be executed by the satellite network to remap VLAN tags.

FIG. 5 is a flowchart of an example process 500 that may be executed by the satellite network 100 to remap VLAN tags. Portions of the process 500 may be performed at the terminal 110, the gateway 115, or a combination thereof. At block 505, packets may be received. The packets received at block 505 may include VLAN packets 200 that have a VLAN tag or non-VLAN packets 200 (e.g., packets without a VLAN tag). Decision block 510 includes determining whether the VLAN packet 200 includes an original VLAN tag. If so, the process 500 proceeds to block 515 where the original VLAN tag is removed. At block 520, a new VLAN tag is selected for the packet. The new VLAN tag may be selected from, e.g., a lookup table or other database relating the original VLAN tag to the new VLAN tag. At block 525, the packet is encapsulated with the new VLAN tag. If the packet does not have a VLAN tag, the process 500 proceeds from block 510 back to block 505 while the system awaits new packets.

Figure 6:
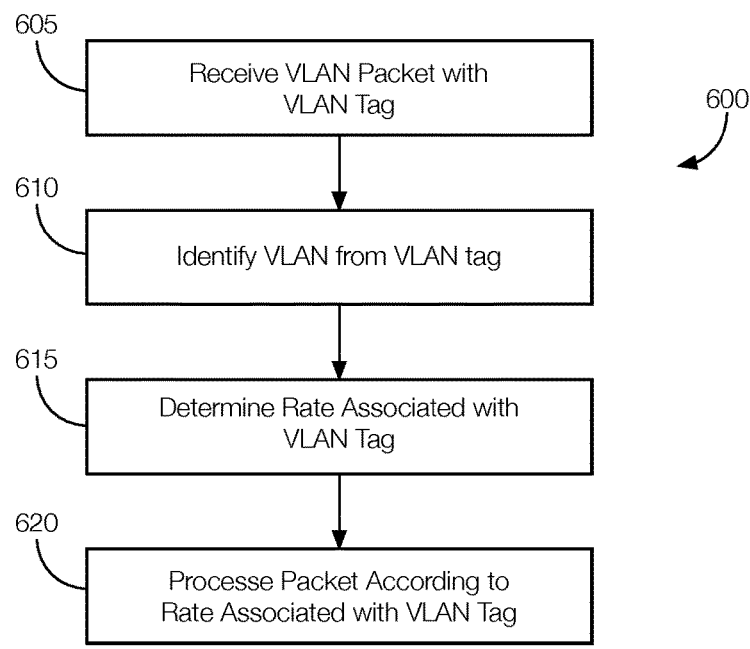
FIG. 6 is a flowchart of an example process that may be executed by the satellite network to implement VLAN-based rate control.

FIG. 6 is a flowchart of an example process 600 that may be executed by the satellite network 100 to provide VLAN-based rate control. Portions of the process 600 may be performed at the terminal 110, the gateway 115, or a combination thereof. At block 605, a VLAN packet 200, with a VLAN tag, is received. At block 610, a VLAN is identified from the VLAN tag. At block 615, a rate is determined from the VLAN tag. The rate may be determined from, e.g., a look-up table or other database relating the VLAN tag to a particular processing rate. At block 620, the VLAN packet 200 is processed according to the rate determined at block 615.

Figure 7:
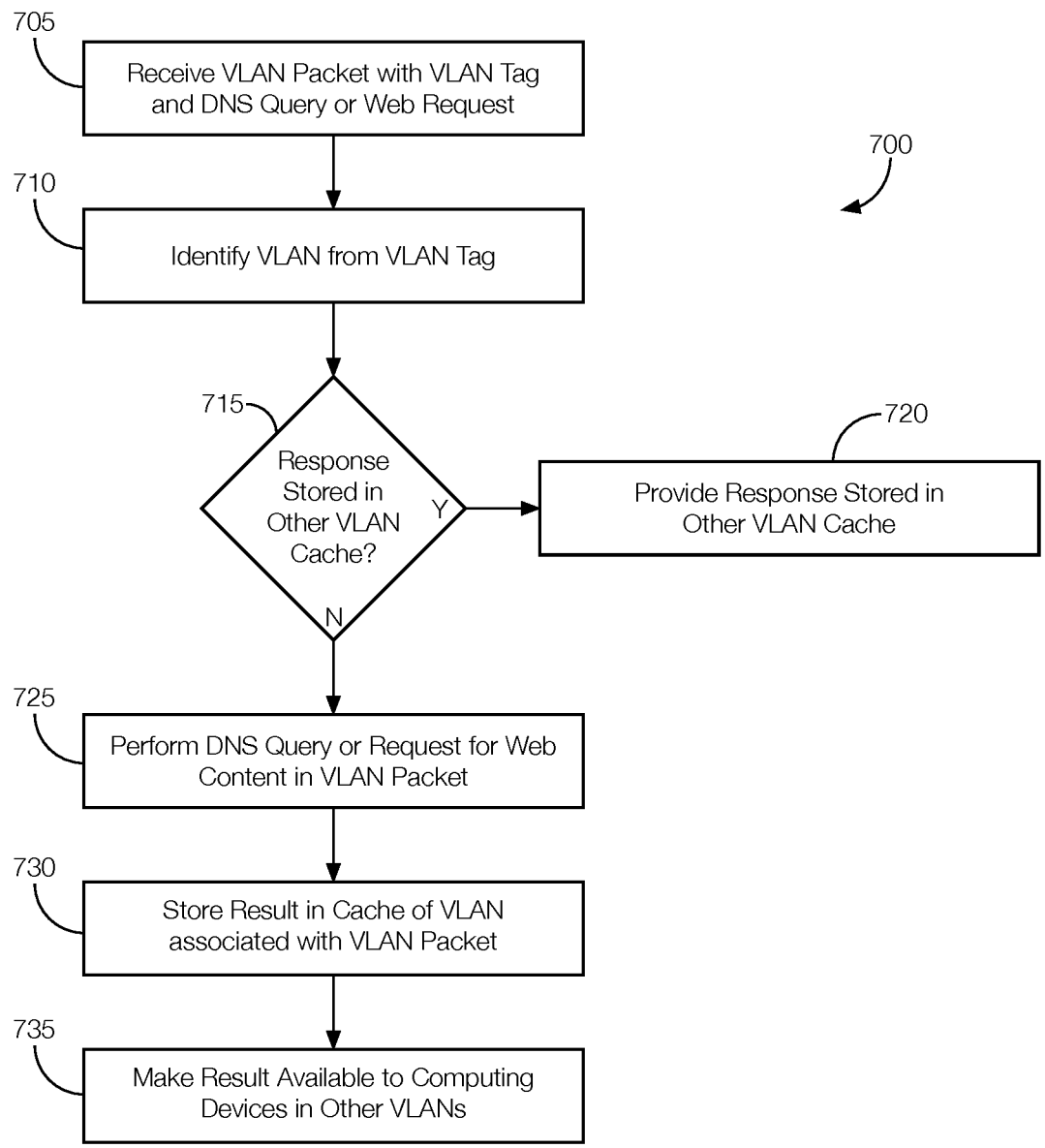
FIG. 7 is a flowchart of an example process that may be executed by the satellite network to share DNS and web prefetching caches.

FIG. 7 is a flowchart of an example process 700 that may be executed by the satellite network 100 to share DNS and web prefetching caches. Portions of the process 700 may be performed at the terminal 110, the gateway 115, or a combination thereof. At block 705, a VLAN packet 200, with a VLAN tag, is received. The VLAN packet 200 further includes a DNS query or a request for web content. At block 710, a VLAN is identified from the VLAN tag. At decision block 715, a component of the satellite network 100 determines if a response to the DNS query or request for web content is stored in the cache of another VLAN. That is, at block 715, the component of the satellite network 100 determines if a component on another VLAN recently made the same DNS query or request for the same web content and if the response is stored in the cache associated with that VLAN. If so, the process 700 proceeds to block 720 where the component provides the response stored in the cache associated with the other VLAN. If no, the process 700 proceeds to block 725 where the component performs the DNS query or request for web content. At block 730, the result is stored in the cache associated with the VLAN of the component that made the request (e.g., the component that transmitted the VLAN packet 200 at block 705). At block 735, the result is sent to the requesting component. At block 740, the result is made available, via the cache associated with the VLAN of the component that made the request, to components associated with other VLANs.

Figure 8:
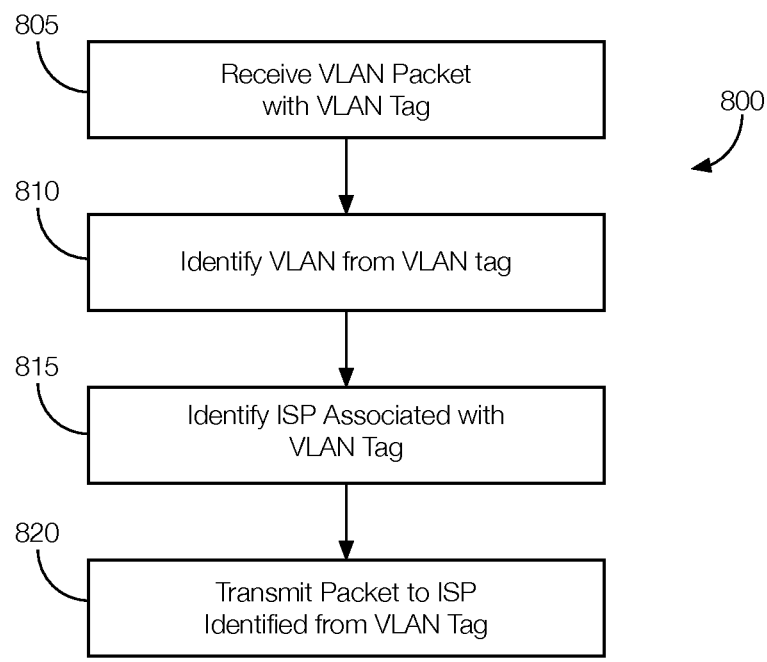
FIG. 8 is a flowchart of an example process that may be executed by the satellite network to provide virtual network operator VLAN provisioning.

FIG. 8 is a flowchart of an example process 800 that may be executed by the satellite network 100 to provide jurisdictional (e.g., by country) virtual network operator (VNO) VLAN provisioning. Portions of the process 800 may be performed at the terminal 110, the gateway 115, or a combination thereof. At block 805, a VLAN packet 200, with a VLAN tag, is received. At block 810, a VLAN is identified from the VLAN tag. At block 815, an ISP is identified from the VLAN tag. The ISP may be determined from, e.g., a look-up table or other database relating the VLAN tag to a particular ISP. At block 820, the packet is transmitted to the identified ISP.

In general, the computing systems and/or devices described may employ any of a number of computer operating systems, including, but by no means limited to, versions and/or varieties of the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance. Examples of computing devices include, without limitation, network devices such as a gateway or terminal, a computer workstation, a server, a desktop, notebook, laptop, or handheld computer, or some other computing system and/or device.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A satellite telecommunication system comprising:
a satellite;
a first computing device; and
a second computing device,
wherein the first computing device is in communication with the satellite and is programmed to generate a virtual local area network (VLAN) packet with a VLAN tag and transmit the VLAN packet to the second computing device via the satellite,
wherein the second computing device is in communication with the satellite and is programmed to:
receive the VLAN packet via the satellite,
then determine VLAN tag information from the VLAN tag, and then
forward at least the original packet to a third computing device while preserving VLAN tag information associated with the VLAN tag so that the VLAN tag is readable by the third computing device,
wherein the first computing device is one of a satellite terminal or a satellite gateway,
wherein the second computing device is the other of the satellite terminal or the satellite gateway, wherein at least one of the first computing device or the second computing device remaps the VLAN tag information such that the remapped VLAN tag information includes at least two different sets of VLAN tag information, wherein a first set of the at least two different sets corresponds to a first satellite gateway and a second set of the at least two different sets corresponds to a second satellite gateway,
wherein the second computing device is programmed to implement a VLAN-based rate control, wherein implementing the VLAN-based rate control includes determining, from a look-up table, a processing rate associated with the VLAN tag and processing the VLAN packet according to the processing rate associated with the VLAN tag.

2. The satellite telecommunication system of claim 1, wherein the second computing device is programmed to preserve the VLAN tag information by removing a VLAN header from the VLAN packet and saving the VLAN tag information included in the VLAN header.

3. The satellite telecommunication system of claim 1, wherein at least one of the first computing device and the second computing device are programmed to prioritize network traffic according to the VLAN tag.

4. The satellite telecommunication system of claim 1, wherein the VLAN tag is an original VLAN tag and wherein the second computing device is programmed to remap the original VLAN tag to a new VLAN tag.

5. The satellite telecommunication system of claim 4, wherein remapping the original VLAN tag to a new VLAN tag includes determining the new VLAN tag for the original packet based at least in part on the original VLAN tag and encapsulating the original packet with the new VLAN tag.

6. The satellite telecommunication system of claim 1, wherein the second computing device is programmed to share a cache between multiple VLANs.

7. The satellite telecommunication system of claim 6, wherein the VLAN tag include a first VLAN tag and wherein sharing the cache between multiple VLANs includes receiving a DNS query associated with a first VLAN tag, storing a result of the DNS query associated with the first VLAN tag in the cache, and making the result available from the cache in response to a DNS query associated with a second VLAN tag.

8. The satellite telecommunication system of claim 6, wherein the VLAN tag include a first VLAN tag and wherein sharing the cache between multiple VLANs includes receiving a request for web content associated with a first VLAN tag, storing a result of the request for web content associated with the first VLAN tag in the cache, and making the result available from the cache in response to a request for web content associated with a second VLAN tag.

9. The satellite telecommunication system of claim 1, wherein the second computing device is programmed to provide virtual network operator VLAN provisioning.

10. The satellite telecommunication system of claim 9, wherein providing virtual network operator VLAN provisioning includes identifying a service provider associated with the VLAN tag and transmitting the VLAN packet to the service provider associated with the VLAN tag.

11. The satellite telecommunication system of claim 1, wherein implementing the VLAN-based rate control includes:
using a predictive learning process to predict satellite optimization gains; and
dynamically changing VLAN rates based on the predicted satellite optimization gains.

12. A method comprising:
receiving, at a computing device in a satellite network, a virtual local area network (VLAN) packet with a VLAN tag and an original packet;
determining VLAN tag information from the VLAN tag;
forwarding at least the original packet while preserving VLAN tag information associated with the VLAN tag;
implementing a VLAN-based rate control including:
determining a processing rate associated with the VLAN tag; and
processing the VLAN packet according to the processing rate associated with the VLAN tag;
preserving the VLAN tag information by removing a VLAN header from the VLAN packet, processing the VLAN packet after removing the VLAN header, and appending the VLAN header to the VLAN packet before transmitting the VLAN packet out of the satellite network,
wherein preserving the VLAN tag information further comprises:
remapping the VLAN tag information such that the remapped VLAN tag information includes at least two different sets of VLAN tag information, wherein a first set of the at least two different sets corresponds to a first satellite gateway and a second set of the at least two different sets corresponds to a second satellite gateway.

13. The method of claim 12, further comprising prioritizing network traffic according to the VLAN tag.

14. The method of claim 12, wherein the VLAN tag is an original VLAN tag and the method further comprising remapping the original VLAN tag to a new VLAN tag, wherein remapping the original VLAN tag to a new VLAN tag includes:
determining the new VLAN tag for the original packet based at least in part on the original VLAN tag; and
encapsulating the original packet with the new VLAN tag.

15. The method of claim 12, wherein the VLAN tag includes a first VLAN tag, the method further comprising sharing a cache between multiple VLANs including:
  receiving a DNS query associated with the first VLAN tag;
  storing a result of the DNS query associated with the first VLAN tag in the cache; and
  making the result available from the cache in response to a DNS query associated with a second VLAN tag.

16. The method of claim 12, wherein the VLAN tag includes a first VLAN tag, the method further comprising sharing a cache between multiple VLANs including:
  receiving a request for web content associated with a first VLAN tag;
  storing a result of the request for web content associated with the first VLAN tag in the cache; and
  making the result available from the cache in response to a request for web content associated with a second VLAN tag.

17. The method of claim 12, further comprising providing virtual network operator VLAN provisioning by:
  identifying a service provider associated with the VLAN tag; and
  transmitting the VLAN packet to the service provider associated with the VLAN tag.

18. The method of claim 12, wherein implementing the VLAN-based rate control includes:
  using a predictive learning process to predict satellite optimization gains; and
  dynamically changing VLAN rates based on the predicted satellite optimization gains.

19. A satellite telecommunication system comprising:
  a satellite;
  a first computing device; and
  a second computing device,
  wherein the first computing device is in communication with the satellite and is programmed to generate a virtual local area network (VLAN) packet with a VLAN tag and transmit the VLAN packet to the second computing device via the satellite,
  wherein the second computing device is in communication with the satellite and is programmed to:
    receive the VLAN packet via the satellite,
    then determine VLAN tag information from the VLAN tag, and then
    forward at least the original packet to a third computing device while preserving VLAN tag information associated with the VLAN tag,
  wherein the first computing device is one of a satellite terminal or a satellite gateway,
  wherein the second computing device is the other of the satellite terminal or the satellite gateway,
  wherein the second computing device is programmed to preserve the VLAN tag information by removing a VLAN header from the VLAN packet, process the VLAN packet after removing the VLAN header, and append the VLAN header to the VLAN packet before transmitting the VLAN packet out of the satellite network, wherein at least one of the first computing device or the second computing device remaps the VLAN tag information such that the remapped VLAN tag information includes at least two different sets of VLAN tag information, wherein a first set of the at least two different sets corresponds to a first satellite gateway and a second set of the at least two different sets corresponds to a second satellite gateway,
  wherein the second computing device is programmed to implement a VLAN-based rate control, wherein implementing the VLAN-based rate control includes determining, from a look-up table, a processing rate associated with the VLAN tag and processing the VLAN packet according to the processing rate associated with the VLAN tag.

20. The satellite telecommunication system of claim 19, wherein implementing the VLAN-based rate control includes:
  using a predictive learning process to predict satellite optimization gains; and
  dynamically changing VLAN rates based on the predicted satellite optimization gains.

* * * * *